May 23, 1967  G. A. DMITROFF ETAL  3,321,019

FIBERGLASS BLADE

Filed Oct. 22, 1965  6 Sheets-Sheet 3

INVENTORS
GEORGE A. DMITROFF
ALDEN E. FOX

BY Vernon F. Hauschild
ATTORNEY

United States Patent Office 3,321,019
Patented May 23, 1967

3,321,019
FIBERGLASS BLADE
George A. Dmitroff and Alden E. Fox, both of Trumbull, Conn., assignors to United Aircraft Corporation, East Hartford, Conn., a corporation of Delaware
Filed Oct. 22, 1965, Ser. No. 512,256
20 Claims. (Cl. 170—159)

This invention relates to helicopter blades made of plastic reinforced with woven fiberglass cloth and more particularly to the construction and method of construction of the root end thereof.

Reinforced fiberglass blades for use on helicopters have many advantages over the present day metal blades in that the reinforced plastic blade would have improved fatigue life. In addition, because the reinforced plastic blades would be made in matched metal molds, each blade can be produced and reproduced precisely, thereby eliminating blade balancing problems due to blade differences. Further, because reinforced plastic is an orthotropic material, it is possible by varying the reinforcement, and thereby varying the material modulus to permit the design of a one-piece blade without excessive stress problems. Additionally, the reinforced fiberglass blade is a high strength-to-weight blade, is noncorrosive, has excellent weather resistant qualities, its physical properties are unaffected by atmospheric temperatures, and most important, has high fatigue properties.

Fiberglass, however, is somewhat deficient in shear strength and therefore presents problems with respect to attaching the fiberglass blade root to the helicopter rotor because there is a tendency for the blade loads to cause the retaining bolts to shear out the bolt holes in the plastic blade root.

This shear weakness of fiberglass could be overcome by inserting a metal block within the fiberglass blade root, but such a solution would present very little contact area between the fiberglass and the metal block for adhesion and retention purposes. Also, there would be high stress concentration in the area between the metal block and the fiberglass as load is transmitted therebetween.

It is accordingly an object of this invention to teach apparatus and method for fabricating the root end of a reinforced plastic blade for a helicopter wherein a series of thin metal shims, plates, or inserts are embedded in the plastic blade root and extend substantially parallel to the blade chord, and wherein at least one ply of plastic impregnated woven fiberglass cloth is positioned between the metal laminates and is adhesively bonded thereto and extends therefrom into the remainder of the blade. Further, blade retaining bolts pass through bolt holes in the blade root which extend perpendicular to the chord so that the fiberglass blade loads are transmitted by the plastic impregnated fiberglass cloth into the metal plates in shear, and are then transmitted into the retaining bolts and into the blade retaining means.

It is a further object of this invention to teach such a fiberglass reinforced plastic blade root wherein the metal plates are made of a metal such as aluminum which has the quality that the shear strength of a number of thin plates of the metal is greater than the shear strength of a solid block of the metal with the same total thickness, i.e., cross-sectional area.

It is still a further object of this invention to teach such a root construction for a fiberglass reinforced plastic blade wherein the metal plates are of varying length in a spanwise direction, and varying width in a chordwise direction, and oriented to present a tapering plate pattern which will transmit loads between the blade retaining means and the blade over a large section of the blade and which will transmit such loads into the thin wall section of the blades without seriously affecting blade flexibility.

It is still a further object of this invention to teach such a root section of a reinforced plastic blade for a helicopter wherein the aforementioned tapered plate pattern peaks at approximately the center of the helicopter blade wall.

It is still a further object of this invention to teach a root section for such a fiberglass reinforced plastic blade wherein any metal deformation tendency in the metal plates caused by bearing loads imparted to the plates by the blade retaining bolts would be reduced by the resistance of the plastic impregnated fiberglass cloth to compression due to its high modulus, i.e., stress divided by strain.

It is still a further object of this invention to teach a root end construction for a fiberglass reinforced plastic blade which will have good root attachment qualities while maintaining the root section of any desired shape consistent with the blade shape.

It is still a further object of this invention to teach such a reinforced plastic blade root construction wherein the aforementioned aluminum reinforcing plates are about the same thickness as the reinforcing ply it replaces and have etched face surfaces, roughened by the etching, and are then coated with a suitable primer to prevent metal oxidation and to improve the adhesion between the metal plates and the plastic impregnated fiberglass cloth.

It is still a further object of this invention to teach such a root section for a helicopter fiberglass reinforced plastic blade wherein the fiberglass cloth used in the blade walls is orthotropic and of balanced construction, having substantially equal modulii of elasticity in the 0° (span) and 90° (chord) directions, while the woven fiberglass cloth used to fabricate the blade skin is of unidirectional construction having maximum modulus of elasticity along the blade span while having minimum modulus along the blade chord, and wherein a central plastic spar is used in the center of the blade, extending from the root to the tip, and which is reinforced with fiberglass roving.

Unidirectional glass reinforced plastic, or glass roving reinforced plastic as used in the spar, provides high specific tensile strength, i.e. high strength-to-weight ratio to carry the centrifugal loads of the rotating blade. In addition, it provides greater weight close to the leading edge, as required for aerodynamic balance of the blade.

It is still a further object of this invention to teach helicopter fiberglass cloth reinforced plastic blade having a root section comprising alternate bonded layers of thin metal plates and plastic impregnated fiberglass and wherein the plates are of varying size and shape to conform to blade shape.

It is still a further object of this invention to teach a root construction for a helicopter reinforced plastic blade including a plurality of load carrying metal reinforcing plates having a layer of plastic impregnated fiberglass cloth positioned therebetween to serve, in part, as an insulator to reduce the transfer of the heat of friction generated in the load carrying plates.

It is still a further object of our invention to teach a fiberglass cloth reinforced plastic blade for helicopters with a root section having alternate layers of single flat, metal plates and single layers, sheets or ply of fiberglass cloth positioned in symmetric, tapered patterns extending in a spanwise and chordwise direction on opposite sides of a flat plastic central spar, and with the clot hand plates adhesively bonded together and to said spar.

Other objects and advantages will be apparent from the specification and claims and from the accompanying drawings which illustrate an embodiment of the invention.

Figures 1, 8, 9:
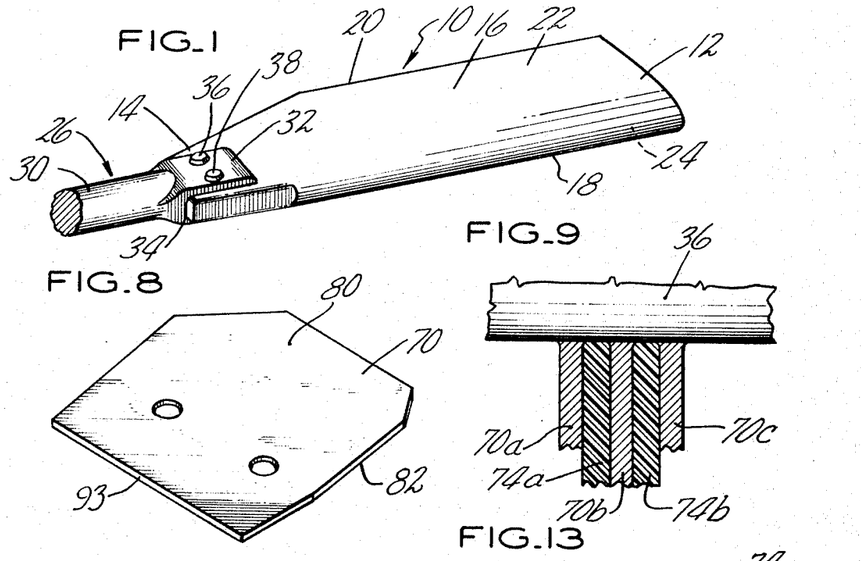
FIG. 1 is a perspective showing of a helicopter plastic blade reinforced with woven fiberglass cloth and illustrating the blade-to-rotor attachment means.
FIG. 8 is a perspective showing of a typical metal reinforcing plate, laminate, shim, or insert.
FIG. 9 is a cross-sectional view through a blade retaining bolt acting against juxtapositioned and alternately bonded layers of thin metal reinforcing plates and plastic impregnated woven fiberglass cloth to illustrate the bearing load cooperation which exists between these members during blade operation.
Figures 10, 11, 12, 13:
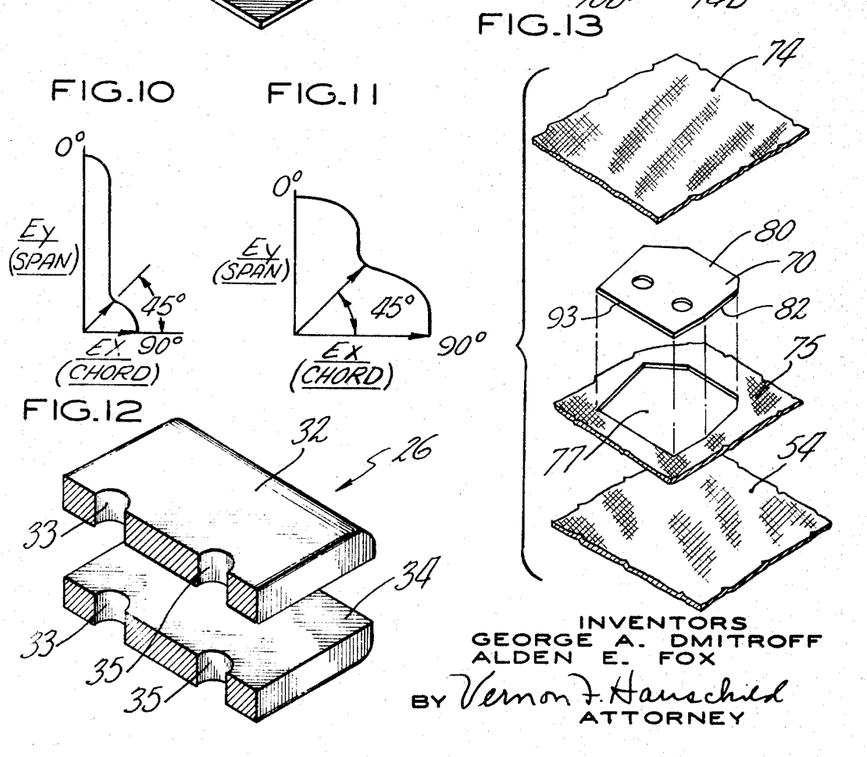
FIG. 10 is an illustration of the modulii of an orthotropic and unidirectional construction of fiberglass woven cloth or roving.
FIG. 11 is an illustration of the modulii of an orthotropic and a balanced construction of woven fiberglass cloth.
FIG. 12 is a perspective showing of the blade retaining means.
FIG. 13 is a diagrammatic, exploded view shown in perspective to illustrate the interrelation and build-up of the fiberglass ply or sheets and the metal reinforcing plates.

Referring to FIG. 1 we see a fiberglass cloth reinforced plastic helicopter blade 10 which includes blade tip section 12, blade root section 14 and blade airfoil section 16 therebetween. Blade 10 further includes blade leading edge 18, and blade trailing edge 20, as well as blade side walls 22 and 24. Blade 10 is attached to the helicopter rotor (not shown) through blade attachment means 26, which includes shaft element 30 which bifurcates into allochiral retaining plates 32 and 34, which are positioned on opposite sides of blade side walls 22 and 24 at the blade root section 14, and which have blade retaining bolts 36 and 38 passing therethrough. Blade attachment means 26 is best shown in FIG. 12 and it will be noted that retaining plates 32 and 34 have aligned bolt holes 33 and 35.

Referring to FIG. 2–7 we see blade 10 in greater particularity.

Figures 2, 3:
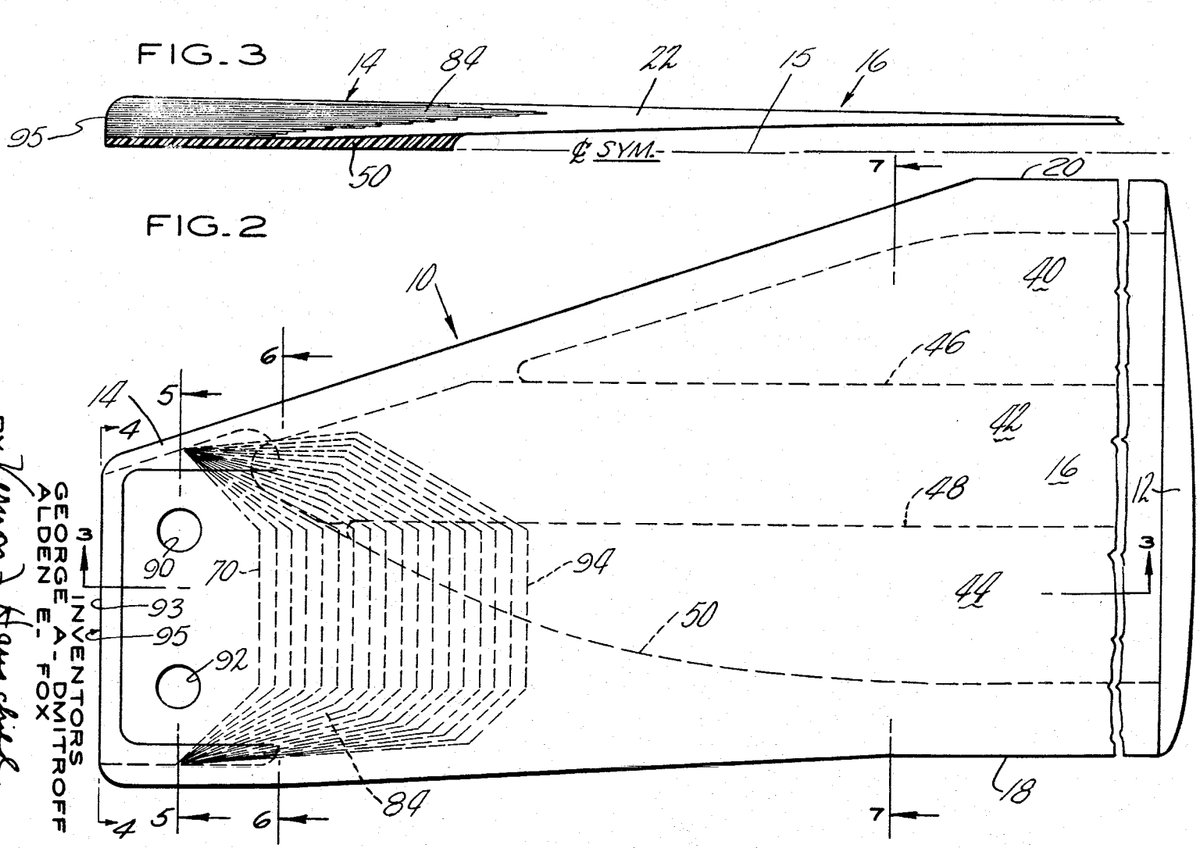
FIG. 2 is a plane view of a fiberglass cloth reinforced plastic blade for a helicopter illustrating our blade root construction.
FIG. 3 is a schematic cross-sectional view taken along line 3—3 of FIG. 2.
Figure 6:
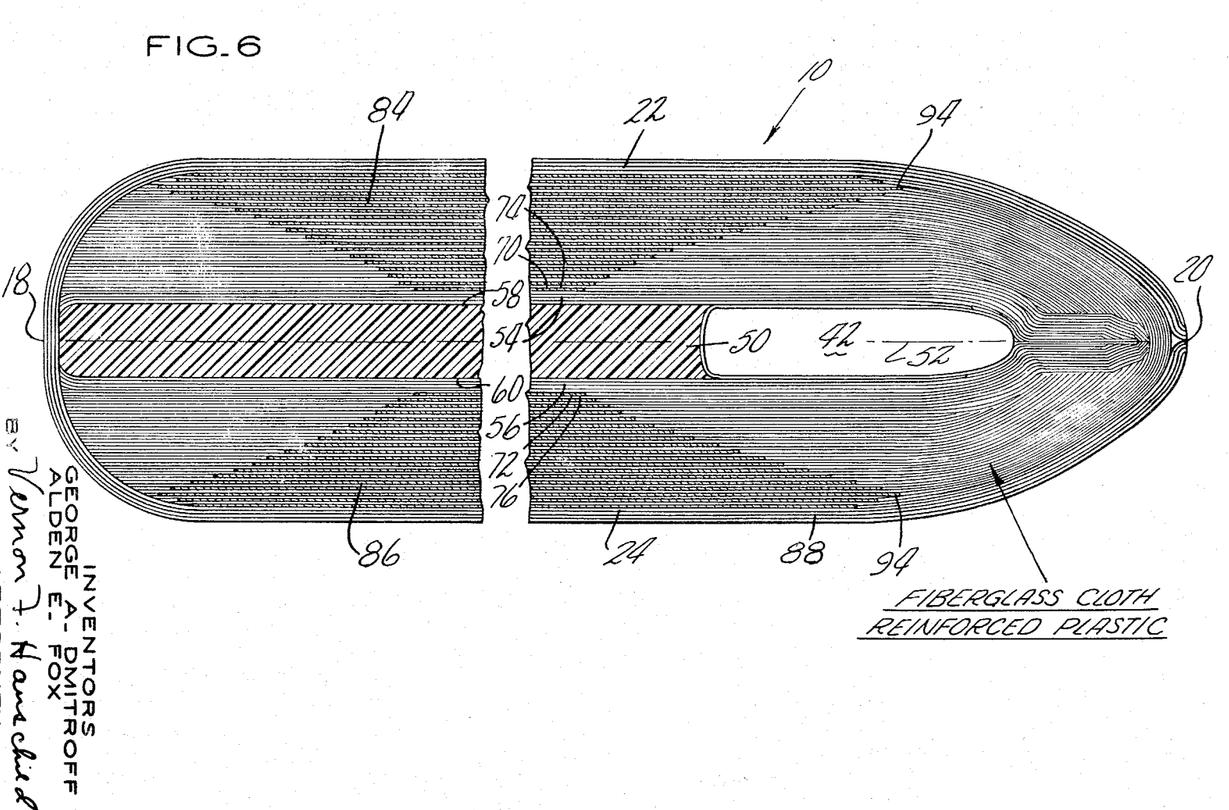
FIG. 6 is a cross-sectional view taken along line 6—6 of FIG. 2.
Figure 7:
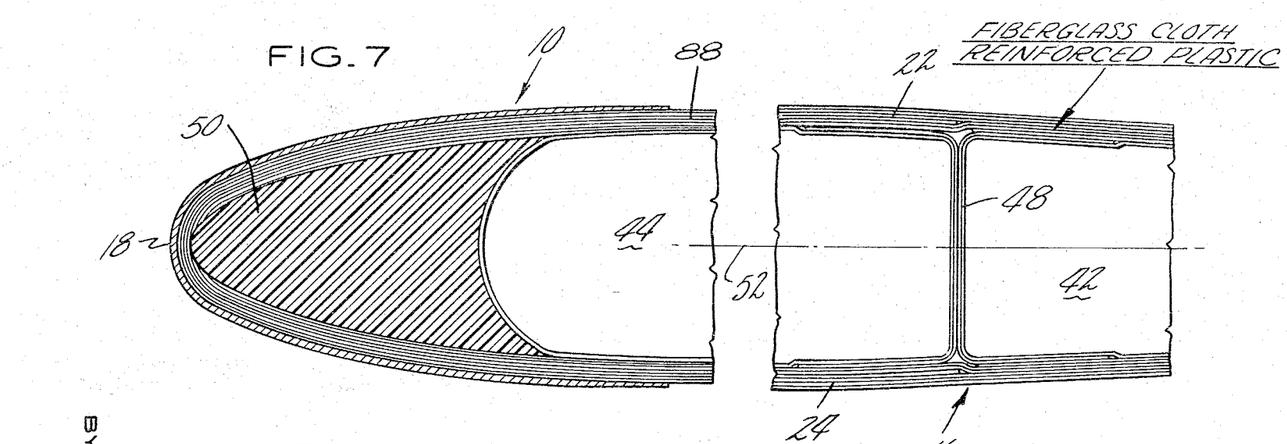
FIGS. 7 and 7A are complimentary cross-sectional views taken along line 7—7 of FIG. 2.
Figure 7A:
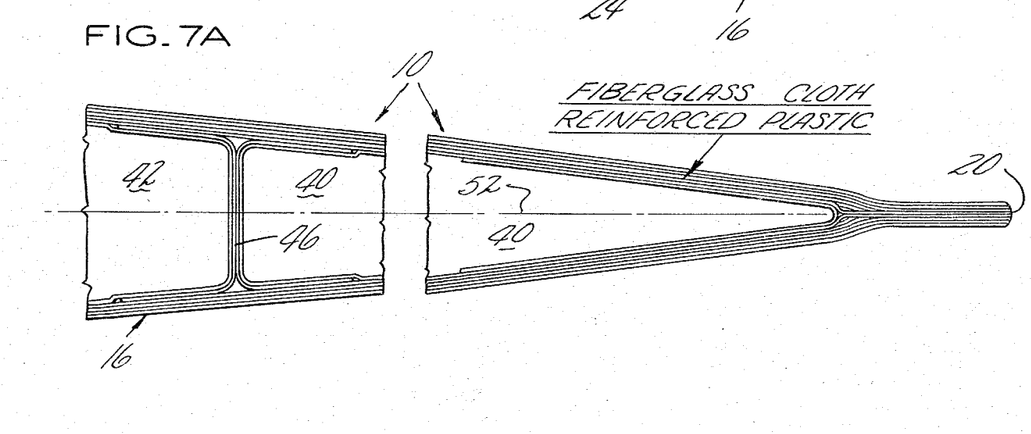

In conventional fashion, the blade span runs between blade root section 14 and blade tip section 12 and the blade chord runs between blade leading edge 18 and blade trailing edge 20. Blade longitudinal axis 15 is shown in FIG. 3. It will be noted that blade 10 is substantially hollow in that it includes cavities 40, 42 and 44 with plastic impregnated fiberglass cloth walls 46 and 48 extending therebetween. These cavities 40, 42 and 44 are formed by the use of mandrels when blade 10 is fabricated in a metal mold but such use of mandrels forms no part of this invention and is described in detail in U.S. Patent No. 3,028,292 to which reference may be had. Central reinforcing spar 50 extends for the full span of blade 10 and it will be noted by viewing FIGS. 3, 4 and 5 that spar 50 is flat and extends symmetrically along blade chord 52 at blade root section 14 and gradually changes shape as shown in FIGS. 2, 6 and 7 so that it eventually passes along the blade leading edge 18 of blade airfoil section 16 (see FIG. 7). Central spar 50 is the strength member of the rotor blade and is made of high density reinforced plastic, and preferably is made of a fiberglass roving reinforced plastic which extends from blade root section 14, to blade tip section 12, throughout the span dimension.

Figure 3A:
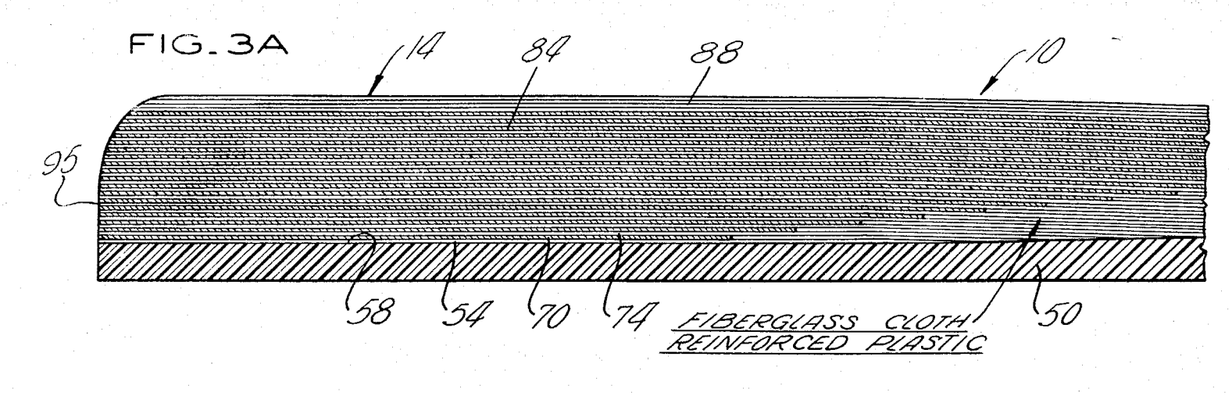
FIGS. 3A and 3B are complimentary enlarged showings of the blade shown in cross-section in FIG. 3 to bring out details at the root section.
Figure 3B:
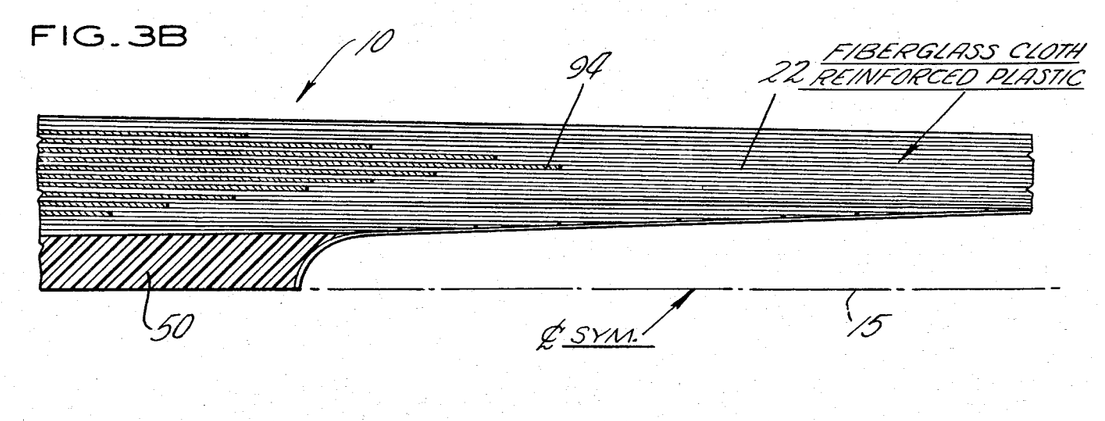
Figure 4:
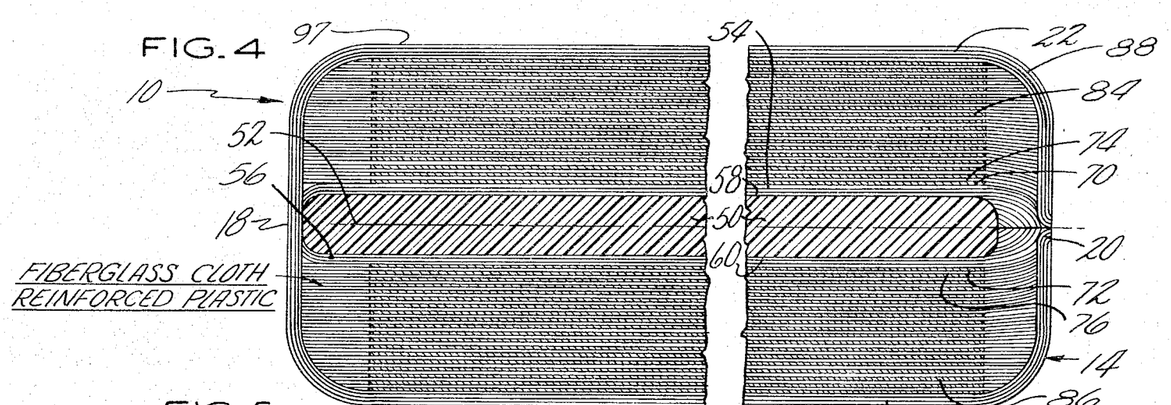
FIG. 4 is a cross-sectional view taken along line 4—4 of FIG. 2.

Still referring to FIGS. 2–6 we see that blade root section 16 includes a plurality of layers of plastic impregnated woven fiberglass cloth 54 and 56 positioned along the opposite face surfaces 58 and 60 of spar 50 and that a series of thin reinforcing plates such as 70 and 72 are positioned on opposite sides of spar 50 and extend parallel to face surfaces 58 and 60 thereof and also parallel to blade chord 52. At least one layer of plastic impregnated woven fiberglass cloth such as 74 and 76 is positioned between the adjacent reinforcing plates and is adhesively bonded during the laminating process thereto and extend therefrom, as best shown in FIGS. 3, 3A and 3B up into the side walls, such as 22 of the remainder of the blade. The reinforcing plates such as 70 and 72 are preferably fabricated from flat aluminum stock such as 7075–T6 aluminum and are preferably about 10 mils or .010" thick. The face surfaces 80 and 82 of reinforcing plate 70 (FIG. 8) are roughened by an etching process and are then coated with a suitable primer such as EC 1290 made by the Minnesota Mining & Manufacturing Company. The etching process produces a roughened surface and the priming process serves to prevent oxidation of the aluminum metal and provides a better adhesion between the reinforcing plates such as 70 and the plastic reinforced fiberglass cloth segments such as 74.

The fiberglass cloth sheets, such as 74 and 76, used in the interior of blade 10 are preferably of balanced construction, that is, they have substantially equal modulii in the 0° and 90° directions as illustrated in FIG. 11 and may be of the type designated as 481 and sold by Hess, Goldsmith & Company of New York City. This is beneficial because the fabric is best suited to resist the loads encountered in the control portions of the blade.

A plurality of layers of plastic impregnated fiberglass cloth are positioned around the reinforcing plate stacks 84 and 86 and serve to form blade outer skin 88. The fiberglass woven cloth used to form outer skin 88 is preferably of unidirectional construction and of the type shown in FIG. 10 and designated as 143 and sold by J. P. Stevens Company of New York City.

The fabric is unidirectional because it has higher physical properties in one direction than the other. In the fabrication of the blade, the outermost plies are arranged with the direction of highest strength essentially parallel to the longitudinal axis 15 of the blade. Plies of 143 fabric may be mixed with plies of 481 fabric in varying ratios and directions to suit the applied loads.

Another important advantage of this use of directional properties is that a blade may be designed with stiffeners to meet aerodynamic requirements. This is done by using fabrics which will produce a desired modulus of elasticity, and by orienting the fabrics in directions to best resist the applied bending forces.

Figure 5:
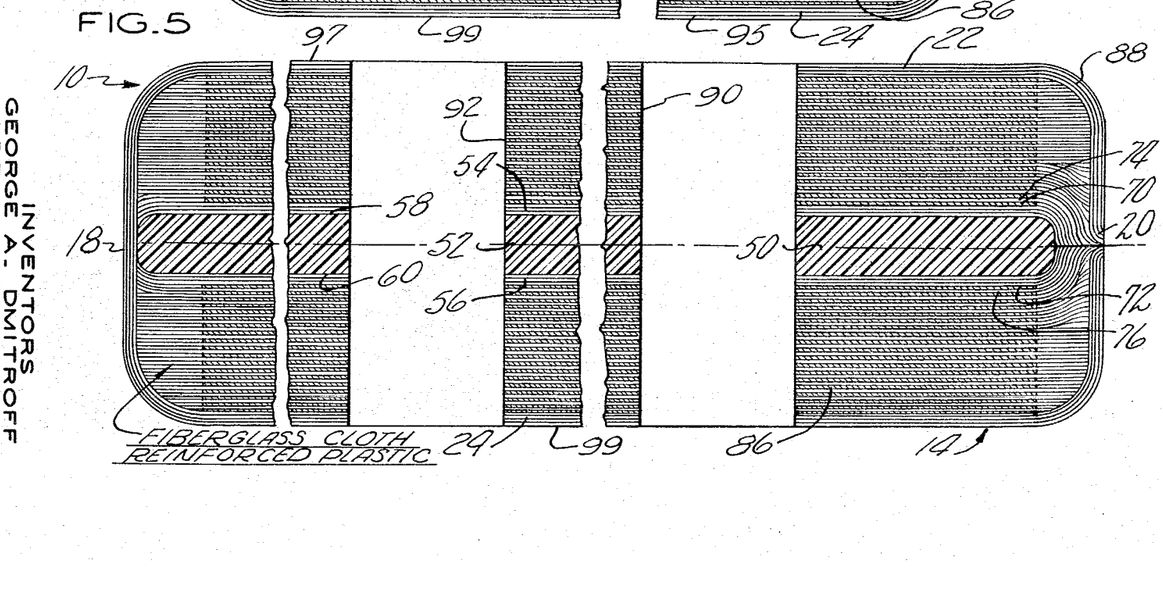
FIG. 5 is a cross-sectional view taken along line 5—5 of FIG. 2.

As best illustrated in FIGS. 2 and 5, blade retaining bolt holes 90 and 92 pass through outer skin 88, the reinforcing plate stacks 84 and 86, the plastic reinforced fiberglass cloth elements such as 74 and 76 and the central spar 50. The blade retaining bolts such as 36 and 38 shown in FIG. 1 pass snugly through bolt holes 90 and 92 and bolt holes 33 and 35 in the plate members 32 and 34 of blade retaining means 26 and thereby serve to fasten blade 10 through blade root section 14 to the helicopter rotor (not shown).

In this fashion, all of the loads of blade 10 are passed to blade retaining means 26 through a shear loading action which takes place between the various reinforcing plates such as 70 and 72 of reinforcing plate stacks 84 and 86 and the plastic impregnated fiberglass cloth sections such as 74 and 76 which are positioned between and adhesively bonded to the opposite face surfaces 80 and 82 (FIG. 8) of each of the reinforcing plates such as 70, to evenly distribute this load transmission throughout a large portion of blade 10.

It will be noted, as best shown in FIGS. 2, 3, 3A, 3B and 6 that the reinforcing plates of stacks 84 and 86 are of various lengths (along blade span) and widths (along blade chord) and are positioned so as to taper smoothly and form a pattern which peaks at plate 94 at substantially the mid-point of the side walls 22 and 24 along the span of the blade and which also presents a tapered and peaked pattern as best shown in FIG. 6 along the chord dimension of the blade. Accordingly, it is an important teaching of this invention to teach a blade root construction for a plastic blade for a helicopter which is reinforced with fiberglass cloth and which includes a series of spaced, thin, flat, metal plates positioned on opposite sides of a flat central spar and with each adhesively bonded to a plastic impregnated sheet of fiberglass cloth which extends therebetween and which extends therefrom into the remainder of the blade. The stacks of reinforcing plates are tapered smoothly in both a spanwise and a chordwise direction of the blade to impart blade-to-retaining means loading uniformly throughout a large portion of the blade, and to provide minimum resistance to blade flexibility.

Preferably, the plastic impregnated fiberglass cloth sheets such as 74 and 76 which extend between the reinforcing plates such as 70 and 72 are of substantially the same thickness as the plates, preferably, 10 mils.

In our construction the blade loading which passes through the blade root is not taken by the plastic alone, but is taken in a shear action between the plastic impregnated fiberglass cloth and the reinforcing plates and in a bearing action between these members and the retaining bolts 36 and 38.

This desirable bearing action is best illustrated in FIG. 9 wherein a series of reinforcing metal plates 70a, 70b and 70c are positioned alternately with the plastic impregnated fiberglass cloth sheets such as 74a and 74b. As bolt 36 tends to load members 70 and 74, any tendency of the aluminum plates 70 to spread or flare slightly will tend to load the fiberglass sheets 74, which are of high modulus and have high crush or compression resistance and hence will serve to effect a sharing of the load between the aluminum plates 70 and the fiberglass cloth plastic sheets 74.

In fabricating blade 10, the central spar 50 is prefabricated and the initial one or more layers of fiberglass cloth 54 are laid smoothly thereagainst (FIG. 13). A second sheet of fiberglass cloth 75 is laid over the first sheet or sheets and the centralmost metal plate 70 is positioned thereon such that its flat base surface 93 is positioned along the flat base 95 of the blade root section 14 illustrated in FIGS. 2, 3 and 3A. The second sheet of fiberglass cloth is cut about the periphery of the first or central metal plate 70 and the cutout portion of the second sheet of fiberglass cloth is removed leaving aperture 77 into which plate 70 snugly fits. A third sheet of fiberglass cloth 74 is smoothly placed over the second sheet of fiberglass cloth 75 and the first or central metal insert 70. A fourth sheet of fiberglass cloth is then smoothly placed over the third sheet of fiberglass cloth 74. The second or next-to-central metal plate is then placed on the fourth layer of fiberglass cloth such that its flat base 93 aligns with the base 93 of the first metal plate and the fourth sheet of fiberglass cloth is cut out along the periphery of the second reinforcing plate and the portion of the fourth sheet of fiberglass cloth so cutout is removed. A fifth piece of fiberglass cloth is smoothly placed over the fourth sheet of fiberglass cloth and the second insert. This process is carried out until the reinforcing plate stacks 84 and 86 are formed on each side of central spar 50 and the plastic cloth sheets forming skin 88 are placed therearound. After the remainder of the blade is fabricated in conventional fashion, preferably by the use of mandrels as disclosed in U. S. Patent No. 3,028,292, the assembly is then placed in a matched metal mold and a liquid plastic such as ERL 2265 as manufactured by Union Carbide and Plastics Company, of New York City is injected into the mold in the conventional vacuum-injection process. This plastic completely impregnates the fiberglass cloth and fills the mold. The blade with the plastic so impregnated and still in the mold is heat treated in conventional fashion to cure the plastic and thereby cause it to harden and to cause the various layers of fiberglass cloth to be adhered to one another and also to cause the layers of fiberglass cloth positioned between the reinforcing metal plates such as 70 to adhere to the plates. In this fashion, a helicopter plastic blade may be formed which has a reinforced root section of any desired shape consistant with the shape of the remainder of the blade. It will be noted that the blade root section 14 illustrated in FIGS. 4 and 5 hereof is substantially flat and symmetric about chord 52 and includes flat side surfaces 97 and 99.

Blade 10 could also have been fabricated by using fiberglass cloth which is already impregnated with plastic and thereby eliminate the plastic injection process within the mold previously described. Such plastic preimpregnation of fiberglass cloth is known as preimpregnated fabric, and is available from numerous manufacturers such as Ferro Corporation of Norwalk, Connecticut. Otherwise, the process of making our blade 10 with the preimpregnated fiberglass cloth is the same as that followed and described above using plastic impregnation after fiberglass and reinforcing plate lay-up.

It will be obvious that any number of helicopter fiberglass reinforced plastic blades may be produced in the same fashion with assurance that the blades will be identical due to the excellent reproducibility of this construction.

Bolt holes 90 and 92 are drilled through the root section 14 of our blade 10 transversally of plates 70 and fiberglass cloth layers 74 after it is removed from the mold. To insure a snug fit between bolt holes 90, 92, 33 and 35 and blade retention bolts 36 and 38, bolts 36 and 38 are suitably reduced in temperature before they are driven into bolt holes 90, 92, 33 and 35.

It will be obvious to those skilled in the art that more than one layer, sheet or ply of woven fiberglass cloth may be used between the metal reinforcing plates such as 70 but it is an important teaching of our inveniton that the thickness of the plastic impregnated fiberglass between the metal reinforcing plates be maintained thin, and preferably the same thickness at the reinforcing plates to provide maximum shear load carrying total surface between the reinforcing plates and the fiberglass cloth reinforced plastic sections therebetween and to obtain the load sharing result illustrated and described in connection with FIG. 9. In our preferred embodiment, a single layer, sheet or ply of woven fiberglass cloth, which is plastic impregnated is located or positioned between and adhesively bonded to adjacent metal reinforcing plates such as plate 70 in plate stacks 84 and 86.

It will accordingly be seen that because the plastic blade taught herein has nothing but woven fiberglass cloth reinforced plastic in the airfoil section thereof and has a root construction comprising a series of thin, parallel metal laminae with a sheet of plastic impregnated fiberglass cloth positioned therebetween and adhering to opposite face surfaces thereof and extending therefrom into the airfoil section, the blade taught herein provides efficient stress distribution from the blade airfoil section or spar to the concentrated loading region at the blade root and also provides effective elastic transmission between the all plastic airfoil section and the plastic-metal root section.

It is to be understood that the invention is not limited to the specific embodiment herein illustrated and described but may be used in other ways without departure from its spirit as defined by the following claims.

We claim:

1. A helicopter blade comprising:
   (a) a tip section, (b) a root section fabricated of fiberglass cloth reinforced plastic,
(c) an airfoil section extending between said tip section and said root section,
(d) a plurality of thin reinforcing plates having opposite face surfaces and being embedded in said fiberglass cloth reinforced plastic root section in face-to-face relation and spaced so that a sheet of plastic impregnated fiberglass cloth is positioned between and adhesively bonded to the face surfaces of each reinforcing plate, and extends therefrom into said airfoil section,
(e) and a bolt hole passing through said root section and the faces of said reinforcing plates and adapted to receive a blade retaining bolt.

2. A helicopter blade comprising:
(a) a tip section,
(b) a root section fabricated of fiberglass cloth reinforced plastic,
(c) an airfoil section extending between said tip section and said root section,
(d) a plurality of reinforcing aluminum plates about .010 inch thick and having opposite face surfaces and being embedded in said fiberglass cloth reinforced plastic root section in face-to-face relation and spaced so that a sheet of plastic impregnated fiberglass cloth is positioned between and adhesively bonded to the face surfaces of each reinforcing plate, and extends therefrom into said airfoil section,
(e) and a bolt hole passing through said root section and the faces of said reinforcing plates and adapted to receive a blade retaining bolt.

3. A fiberglass cloth reinforced plastic blade for helicopters having a chord and span and comprising:
(a) a tip section,
(b) a root section,
(c) an airfoil section extending between said tip section and said root section,
(d) a plurality of thin reinforcing plates having opposite face surfaces and being embedded in said root section in face-to-face relation and oriented to be substantially parallel to the blade chord and spaced so that a sheet of plastic impregnated fiberglass cloth is positioned between and adhesively bonded to the face surfaces of each reinforcing plate, and extends therefrom into said airfoil section,
(e) and a bolt hole passing through said root section and the faces of said reinforcing plates and adapted to receive a blade retaining bolt.

4. A fiberglass cloth reinforced plastic blade having a chord and span and comprising:
(a) a tip section,
(b) a root section,
(c) an airfoil section extending between said tip section and said root section,
(d) a plurality of thin reinforcing aluminum plates having opposite face surfaces and being embedded in said root section in face-to-face relation and oriented to be substantially parallel to the blade chord and spaced so that a sheet of plastic impregnated fiberglass cloth is positioned between and adhesively bonded to the face surfaces of each reinforcing plate, and extends therefrom into said airfoil section,
(e) and a bolt hole passing through said root section and the faces of said reinforcing plates and adapted to receive a blade retaining bolt.

5. A helicopter fiberglas cloth reinforced plastic blade having a chord and span and comprising:
(a) a tip section,
(b) a root section,
(c) an airfoil section extending between said tip section and said root section,
(d) a plurality of flat reinforcing aluminum plates about .010 inch thick and having roughened opposite face surfaces and being embedded in said root section in face-to-face relation and oriented to be substantially parallel to the blade chord and spaced so that a sheet of plastic impregnated fiberglass cloth about .010 inch thick is positioned between and adhesively bonded to the face surfaces of each reinforcing plate and extends therefrom into said airfoil section,
(e) and a bolt hole passing through said root section and the faces of said reinforcing plates and adapted to receive a blade retaining bolt.

6. A helicopter fiberglass cloth reinforced plastic blade having a chord and span and comprising:
(a) a tip section,
(b) a root section,
(c) an airfoil section extending between said tip section and said root section,
(d) a plurality of thin reinforcing plates having opposite face surfaces and being embedded in said root section in face-to-face relation and oriented to be substantially parallel to the blade chord and spaced so that a sheet of plastic impregnated fiberglass cloth is positioned between and adhesively bonded to the face surfaces of each reinforcing plate and extends therefrom into said airfoil section, said reinforcing plates being of various lengths in the blade span direction and of various widths in the blade chord direction and positioned to present a smoothly tapering plate pattern in both the blade chord and span directions,
(e) and a bolt hole passing through said root section and the faces of said reinforcing plates and adapted to receive a blade retaining bolt.

7. A fiberglass cloth reinforced plastic blade for helicopters having a chord, a span, a leading edge and a trailing edge and comprising:
(a) a tip section,
(b) a root section,
(c) a substantially hollow airfoil section extending between said tip section and root section, and defined in part between side walls,
(d) a central support spar extending for substantially the full blade span and being of a flat shape and symmetric about the blade chord in said root section and extending along the blade leading edge in said hollow airfoil section,
(e) a plurality of thin reinforcing plates having opposite face surfaces and being embedded in said root section in face-to-face relation and oriented to be substantially parallel to the blade chord and spaced so that a sheet of plastic impregnated fiberglass cloth is positioned between and adhesively bonded to the face surfaces of each reinforcing plate, and extends therefrom into said airfoil section,
(f) and a bolt hole passing through said root section and the faces of said reinforcing plates and adapted to receive a blade retaining bolt.

8. A substantially hollow, fiberglass cloth reinforced plastic blade for helicopters having a chord, a span, a leading edge and a trailing edge and side walls joining the leading and trailing edges and comprising:
(a) a tip section,
(b) a root section,
(c) a substantially hollow airfoil section extending between said tip section and said root section,
(d) a central support spar extending for substantially the full blade span and being of a flat shape and symmetric about the blade chord in said root section and extending along the blade leading edge in said hollow airfoil section,
(e) a plurality of reinforcing aluminum plates about .010 inch thick and having roughened opposite face surfaces and being embedded in said root section in face-to-face relation and oriented to be substantially parallel to the blade chord and spaced so that a sheet of plastic impregnated fiberglass cloth about .010 inch thick is positioned between and adhesively bonded to the face surfaces of each reinforcing plate, and extends therefrom into said airfoil section, (f) and a bolt hole passing through said root section and the faces of said reinforcing plates and adapted to receive a blade retaining bolt.

9. A substantially hollow, fiberglass cloth reinforced plastic blade for helicopters having a chord, a span, a leading edge and a trailing edge and side walls joining the leading and trailing edges and comprising:
(a) a tip section,
(b) a root section,
(c) a substantially hollow airfoil section extending between said tip section and root section,
(d) a central support spar extending for substantially the full blade span and being of a flat shape and symmetric about the blade chord in said root section and extending along the blade leading edge in said hollow airfoil section,
(e) a plurality of reinforcing aluminum plates about .010 inch thick and having roughened opposite face surfaces and being embedded in said root section in face-to-face relation and oriented to be substantially parallel to the blade chord and spaced so that a sheet of plastic impregnated fiberglass cloth about .010 inch thick is positioned between and adhesively bonded to the face surfaces of each reinforcing plate, and extends therefrom into said airfoil section, said reinforcing plates being of various lengths in the blade span direction and of various widths in the blade chord direction and positioned to present a smoothly tapering plate pattern in both the blade chord and span directions,
(f) and a bolt hole passing through said root section and the faces of said reinforcing plates and adapted to receive a blade retaining bolt.

10. A substantially hollow, fiberglass cloth reinforced plastic blade for helicopters having a chord, a span, a leading edge and a trailing edge and side walls joining the leading and trailing edges and comprising:
(a) a tip section,
(b) a root section,
(c) a substantially hollow airfoil section extending between said tip section and said root section,
(d) a central support spar extending for substantially the full blade span and being of a flat shape and symmetric about the blade chord in said root section and extending along the blade leading edge in said hollow airfoil section,
(e) a plurality of reinforcing aluminum plates about .010 inch thick and having roughened and primed opposite face surfaces and being embedded in said root section in face-to-face relation and oriented to be substantially parallel to the blade chord and spaced so that a sheet of plastic impregnated fiberglass cloth about .010 inch thick is positioned between and adhesively bonded to the face surfaces of each reinforcing plate, and extends therefrom into said airfoil section, said reinforcing plates being of various lengths in the blade span direction and of various widths in the blade chord direction and positioned to present a smoothly tapering plate pattern in both the blade chord and span directions and which pattern peaks at approximately the center of said blade side walls,
(f) and a bolt hole passing through said root section and the faces of said reinforcing plates and adapted to receive a blade retaining bolt.

11. A substantially hollow, fiberglass cloth reinforced plastic blade for helicopters having a chord, a span, a leading edge and a trailing edge and side walls joining the leading and trailing edges and comprising:
(a) a tip section,
(b) a root section,
(c) a substantially hollow airfoil section extending between said tip section and said root section,
(d) a central support spar extending for substantially the full blade span and being of a flat shape and symmetric about the blade chord in said root section and extending along the blade leading edge in said hollow airfoil section,
(e) a plurality of reinforcing aluminum plates about .010 inch thick and having roughened and primed opposite face surfaces and being embedded in said root section in face-to-face spaced relation and oriented to be substantially parallel to the blade chord, a first plurality of sheets of plastic impregnated fiberglass cloth arranged so that a sheet of plastic impregnated fiberglass cloth about .010 inch thick is positioned between and adhesively bonded to the face surfaces of each reinforcing plate and extends therefrom into said airfoil section, a second plurality of sheets of plastic impregnated fiberglass cloth each having a selectively shaped aperture therein and arranged so that a sheet of fiberglass cloth of said second plurality is positioned between adjacent sheets of fiberglass cloth of said first plurality, and further so that one of said aluminum plates fits snugly into each of said apertures, said reinforcing plates being of various lengths in the blade span direction and of various widths in the blade chord direction and positioned to present a smoothly tapering plate pattern in both the blade chord and span directions and which pattern peaks at approximately the center of said blade side walls,
(f) and a bolt hole passing through said root section and the faces of said reinforcing plates and adapted to receive a blade retaining bolt,
(g) blade retaining means including plate members positioned gainst the side walls of said root section and including bolt holes aligned with said bolt hole in said root section,
(h) and a blade retaining bolt passing through said bolt holes in said root section and said blade retaining means and being sized to snugly engage said holt holes.

12. A substantially hollow plastic helicopter blade reinforced with woven fiberglass cloth and having a chord, a span, a leading edge, a trailing edge, and side walls joining said leading and trailing edges and comprising:
(a) a blade tip section,
(b) a blade root section,
(c) a blade airfoil section extending between said tip section and said root section,
(d) a central reinforcing spar extending for substantially the full span of the blade and shaped at the blade root section to be substantially flat and extending symmetrically along the blade chord for substantially the full chord dimension,
(e) a plurality of flat, thin shims having face surfaces and being positioned on opposite sides of said central spar in said blade root section and extending substantially parallel to the blade chord and spaced apart so that at least one layer of plastic impregnated fiberglass cloth extends between and is adhesively bonded to said face surfaces of each shim and extends therefrom into said blade airfoil section,
(f) at least one bolt hole extending through the blade root section and through the face surfaces of said central spar and each shim.

13. Apparatus according to claim 12 wherein said shims are aluminum plates about .010 inch thick.

14. Apparatus according to claim 13 wherein said shims are coated with a primer to prevent oxidation thereof and to strengthen the bond between the shim and the fiberglass cloth reinforced plastic.

15. A helicopter blade made of plastic reinforced with fiberglass cloth and including a root section built up of alternate bonded, substantially equal thickness layers of thin metal plates and plastic impregnated fiberglass cloth and wherein said plates are of varying size and shapes to form a smoothly tapered plate pattern conforming to blade shape, and a blade retaining bolt hole passing through said root section and transversely through said layers.

16. A substantially hollow helicopter blade made of plastic reinforced with woven fiberglass cloth and having a chord, a span, a leading edge, a trailing edge, side walls joining said leading and trailing edges, and a longitudinal axis and comprising:
  (a) a blade tip section,
  (b) a substantially flat blade root section extending along and positioned symmetrically about the blade chord and having a flat base at the extreme blade end at the root section extending perpendicular to the blade chord,
  (c) a substantially hollow blade airfoil section extending between said tip section and said root section,
  (d) a central reinforcing spar extending for substantially the full span of the blade and shaped at the blade root section to be substantially flat and extending symmetrically along the blade chord for substantially the full chord dimension at said flat base, said spar being made of high modulus plastic and having unidirectional, high modulus fiberglass roving embedded therein and extending along the blade span or longitudinal axis,
  (e) a plurality of flat, thin aluminum shims of about .010 inch thickness and having roughened and primed face surfaces and being positioned on opposite sides of said central spar in said blade root section and extending substantially parallel to the blade chord and spaced apart so that a layer of plastic impregnated fiberglass cloth of about .010 inch thickness and of balanced construction extends between and is adhesively bonded to said face surfaces of each shim, and extends therefrom into said side walls of said blade airfoil section, each of said shims extending along said flat base of said root section, said shims being of various lengths in the blade span direction and of various widths in the blade chord direction and positioned to present a smoothly tapering pattern in both the blade chord and span directions and with said tapering pattern peaking at about the center of said blade side walls,
  (f) at least one bolt hole extending through the blade root section and through the face surfaces of said central spar and each shim,
  (g) a blade skin forming the surface of said root section and said airfoil section and including a plurality of layers of plastic impregnated woven fiberglass cloth of unidirectional construction with its high modulus extending along the blade span or longitudinal axis,
  (h) blade retaining means including two plate members positioned against opposite flat sides of said root section and having bolt holes therein aligned with said root section bolt holes,
  (i) and a retaining bolt snugly passing through said bolt holes of said root section and said blade retaining means.

17. The method of fabricating the root end of a reinforced plastic helicopter blade comprising the steps of:
  (a) providing a central bade support spar having flat face surfaces at the blade root section,
  (b) placing a first layer of fiberglass cloth smoothly against one of the central spar face surfaces and extending the fiberglass cloth up into the remainder of the blade,
  (c) placing a second layer of fiberglass cloth smoothly on top of the first layer and extending the fiberglass cloth up into the remainder of the blade,
  (d) placing a first flat metal reinforcing shim of substantially the same thickness as the second layer of fiberglass cloth on the second layer of fiberglass cloth and extending the fiberglass cloth up into the remainder of the blade and cutting the second layer of fiberglass cloth along the periphery of the first metal shim and removing the portion of the second layer of fiberglass cloth so cut out,
  (e) placing a third layer of fiberglass cloth smoothly on top of the second layer of fiberglass cloth and the first shim and extending the fiberglass cloth up into the remainder of the blade,
  (f) placing a fourth layer of fiberglass cloth smoothly on top of the third layer of fiberglass cloth and extending the fiberglass cloth up into the remainder of the blade,
  (g) placing a second metal shim of substantially the same thickness as the fourth layer of fiberglass cloth on the fourth layer of fiberglass cloth and cutting the fourth layer of fiberglass cloth along the periphery of the second metal shim and removing the portion of the fourth layer of fiberglass cloth so cut out,
  (h) repeating this process until a sufficient number of layers of fiberglass cloth and metal shims have been built up to provide a blade wall adjacent the flat central spar at the blade root of selected thickness,
  (i) placing a plurality of layers of fiberglass cloth smoothly on top of the outermost shim,
  (j) repeating this procedure in building up the blade side wall against the opposite face surface of the central spar,
  (k) placing said central spar, fiberglass layer and shims so built up into a mold of selected contour,
  (l) impregnating the fiberglass cloth with plastic,
  (m) curing the plastic so impregnated into the fiberglass within the mold to produce a reinforced plastic helicopter blade of desired shape.

18. The method of producing the root section of a reinforced plastic helicopter blade comprising smoothly placing at least one layer of fiberglass cloth against the opposite face surfaces of the central reinforcing spar of the blade, then building up the side walls of the helicopter blade at the blade root section by utilizing alternate layers of metal reinforcing shims and fiberglass cloth, and with the fiberglass cloth extending into the remainder of the blades, then placing at least one layer of fiberglass cloth external of the outermost shims to form the blade skin, then placing the blade root section so built up into a mold of selected contour, then impregnating the fiberglass cloth with plastic, then curing the impregnated plastic to produce a reinforced fiberglass blade.

19. The method of producing the root section of a reinforced plastic helicopter blade comprising smoothly placing at least one layer of plastic impregnated fiberglass cloth against the opposite face surfaces of the central reinforcing spar of the blade, then building up the side walls of the helicopter blade at the blade root section by utilizing alternate layers of metal reinforcing shims and plastic impregnated fiberglass cloth and with the plastic impregnated fiberglass cloth extending into the remainder of the blade, then placing at least one layer of plastic impregnated fiberglass cloth external of the outermost shims to form the blade skin, then placing the blade root section so built up into a mold of selected contour, then curing the impregnated plastic to produce a reinforced fiberglass blade.

20. The method of producing the root section of a reinforced plastic helicopter blade comprising smoothly placing at least one layer of fiberglass cloth against the opposite face surfaces of the central reinforcing spar of the blade, then building up the side walls of the helicopter blade at the blade root section by utilizing alternate layers of metal reinforcing shims and fiberglass cloth, and with the fiberglass cloth extending into the remainder of the blade, then placing at least one layer of fiberglass cloth external of the outermost shims to form the blade skin, then placing the blade root section so built up into a mold of selected contour, then impregnating the fiberglass cloth with plastic, then curing the impregnated plastic to produce the root section of a reinforced fiberglass blade, then drilling at least one bolt hole through the blade root section so fabricated so that the bolt hole passes through each layer of fiberglass cloth, each shim and the central spar.

References Cited by the Examiner

FOREIGN PATENTS 212,221  3/1957  Australia.

MARTIN P. SCHWADRON, *Primary Examiner.*

EVERETTE A. POWELL, Jr., *Examiner.*